June 12, 1928.

J. W. LEGG 1,672,894

OSCILLOGRAPH

Filed Sept. 8, 1920

WITNESSES:

INVENTOR
Joseph W. Legg
BY
Wesley G. Carr
ATTORNEY

June 12, 1928.

J. W. LEGG 1,672,894

OSCILLOGRAPH

Filed Sept. 8, 1920

WITNESSES:

INVENTOR
Joseph W. Legg
BY
ATTORNEY

June 12, 1928. 1,672,894
J. W. LEGG
OSCILLOGRAPH
Filed Sept. 8, 1920 9 Sheets-Sheet 3

WITNESSES:

INVENTOR
Joseph W. Legg.
BY
Wesley J. Carr
ATTORNEY

June 12, 1928.

J. W. LEGG 1,672,894

OSCILLOGRAPH

Filed Sept. 8, 1920

WITNESSES:

INVENTOR
Joseph W. Legg.
BY
ATTORNEY

June 12, 1928.
J. W. LEGG
OSCILLOGRAPH
Filed Sept. 8, 1920

WITNESSES:

INVENTOR
Joseph W. Legg.
BY
ATTORNEY

June 12, 1928.

J. W. LEGG

OSCILLOGRAPH

Filed Sept. 8, 1920

WITNESSES:

INVENTOR
Joseph W. Legg.
BY
Wesley G. Carr
ATTORNEY

June 12, 1928.

J. W. LEGG 1,672,894

OSCILLOGRAPH

Filed Sept. 8, 1920

WITNESSES:

INVENTOR
Joseph W. Legg.
BY
ATTORNEY

June 12, 1928.　　　　　　　　　　　　　　　　1,672,894
J. W. LEGG
OSCILLOGRAPH
Filed Sept. 8, 1920　　　9 Sheets-Sheet 9

WITNESSES:

INVENTOR
Joseph W. Legg
BY
ATTORNEY

Patented June 12, 1928.

1,672,894

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

OSCILLOGRAPH.

Application filed September 8, 1920. Serial No. 408,954.

My invention relates to oscillographs and particularly to portable oscillographs.

One object of my invention is to provide an oscillograph that shall have such elements as to permit the same to be enclosed in a unitary portable casing.

Another object of my invention is to provide an oscillograph that may be used without the necessity of supplying an auxiliary source of direct current.

Another object of my invention is to provide an oscillograph that shall have automatic means for controlling the shutter, light and film drum.

Another object of my invention is to provide an oscillograph, of the above indicated character, that shall have such variable resistance included therein as to adapt the same for a large range of voltage.

Another object of my invention is to provide an oscillograph, of the above indicated character, that shall have a galvanometer having series connected pole pieces.

A further object of my invention is to provide an oscillograph, of the above indicated character, that shall be simple, light and compact in construction and reliable and accurate in its operation.

Heretofore, oscillographs have been provided that required the use of direct current for the arc lamp and also for the galvanometer. Such devices are not portable and are not self-contained and, together with the essential apparatus, usually weigh over a thousand pounds when ready for shipment.

In my invention, I provide a unitary casing having several compartments therein which include substantially all of the essential elements of an oscillograph. A galvanometer, having series connected pole pieces that are effectively insulated from each other, is provided having a single magnetizing coil. An incandescent lamp that is adapted to operate on over voltage for a relatively short period of time is provided for illuminating the mirrors of the galvanometer and a storage battery is provided for energizing the coil of the galvanometer.

An optical box is provided having the required lenses and prisms to direct the rays, as deflected by the galvanometers, through a shutter to a film reel. The shutter, film reel and light are so automatically controlled that, when the voltage applied to the lamp reaches a predetermined value, the shutter is opened and, after the film reel has rotated once, the shutter is closed and the circuit of the lamp is opened. This so protects the lamp that its life is greatly increased. Variable resistors are disposed in another compartment of the box and operating handles therefor and switches are provided for connecting the resistors in circuit.

The resistors are so chosen that the galvanometers may be used on a relatively large range of voltage. The proper switches and measuring instruments are provided for indicating the galvanometer field current or the battery charge current. All of the above-mentioned devices are arranged in a unitary casing and, together with a board upon which is mounted a transformer and a small induction motor with its proper switches, constitute the essential elements of the oscillograph, which weighs about 135 lbs.

The oscillograph comprises, in general, a casing 1 having a galvanometer 2, resistor 3, an incandescent lamp 4, a storage battery 5, a film drum or reel device 6, an optical box 7 and a controlling mechanism 8. These devices are all disposed in the casing 1 and are actuated by a motor 9 that is mounted on a board 10 upon which a transformer 11 for the lamp is also mounted.

Figure 11:
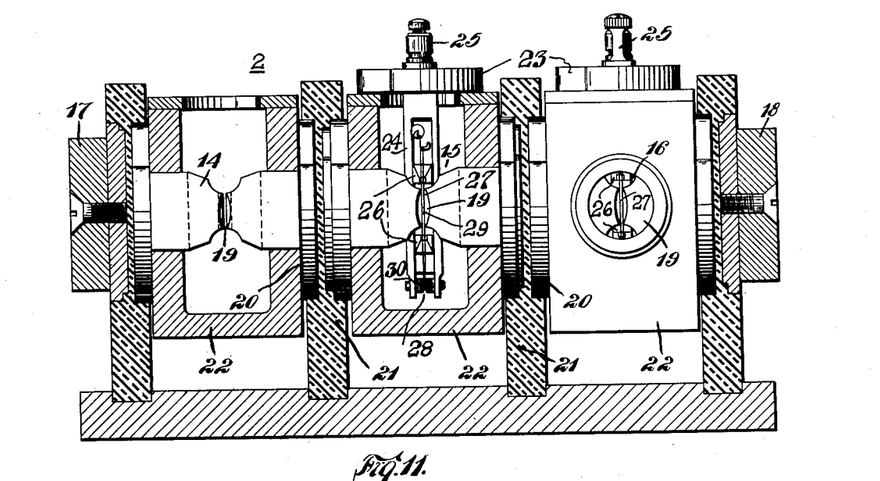
Fig. 11 is a front view, partially in elevation and partially in section, of the galvanometer shown in Figs. 1 and 2.

The galvanometer 2 comprises a magnetizable core member 12 having a winding 13 thereon that may be energized from the battery 5 or from an exterior direct-current circuit. Three pairs of pole pieces 14, 15 and 16 are disposed in series between the poles 17 and 18 of the core member 12, and the pole pieces of each pair are separated by relatively small airgaps 19. The cross-sectional area of the pairs of poles at the airgaps 19 is relatively small to concentrate the magnetic flux thereat. The cross-sectional area of the pole pieces between the pairs of poles at points 20 is relatively large, and insulating members 21 are placed between the various pairs of poles at the points 20 and between the pairs 14 and the pole pieces 17 and the pairs 16 and the pole piece 18. This arrangement is provided in order that the various elements shall be insulated from one another and in order to decrease the reluctance of the circuit.

Figure 12:
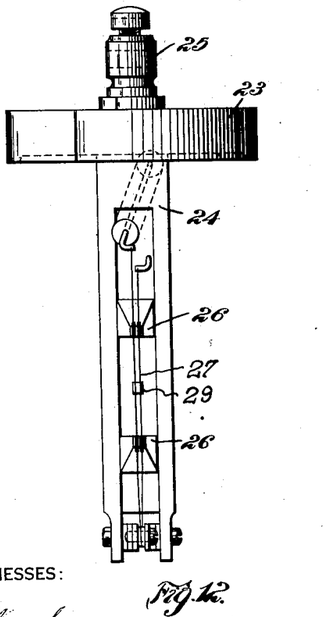
Fig. 12 is a front elevational view of the vibrating element of the galvanometer.
Figure 13:
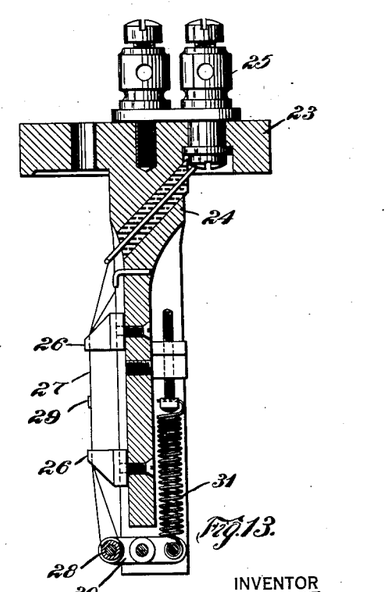
Fig. 13 is a side view, partially in section and partially in elevation, of the vibrating element shown in Fig. 12.

Casings 22 surround each of the pairs of pole pieces and are adapted to receive vibrating elements 23 that comprise a main body portion 24 upon which are mounted terminal members 25 and bridge members 26 over which is disposed a filament 27 that surrounds a pulley 28 and which has a small mirror 29 disposed thereon. The pulley 28 is mounted at one end of a pivoted member 30, the other end of which is operatively connected to an adjustable spring 31.

With this arrangement, the member 30 is so balanced as to its inertia that any jar is absorbed and the likelihood of breakage of the filament is greatly reduced. When the vibrating elements 23 are placed in the receptacles 22, the filament 27 is disposed in the magnetic field of the airgaps 19 and thus the mirror 29 will be turned an amount proportional to the current traversing the filament and, if a beam of light is directed to the mirror, this beam of light will be instantly deflected an amount proportional to the instantaneous quantity being measured. The galvanometer is disposed in the upper rear compartment 32 of the casing 1 opposite the optical compartment 7 and substantially in alinement with the same.

Figure 3:
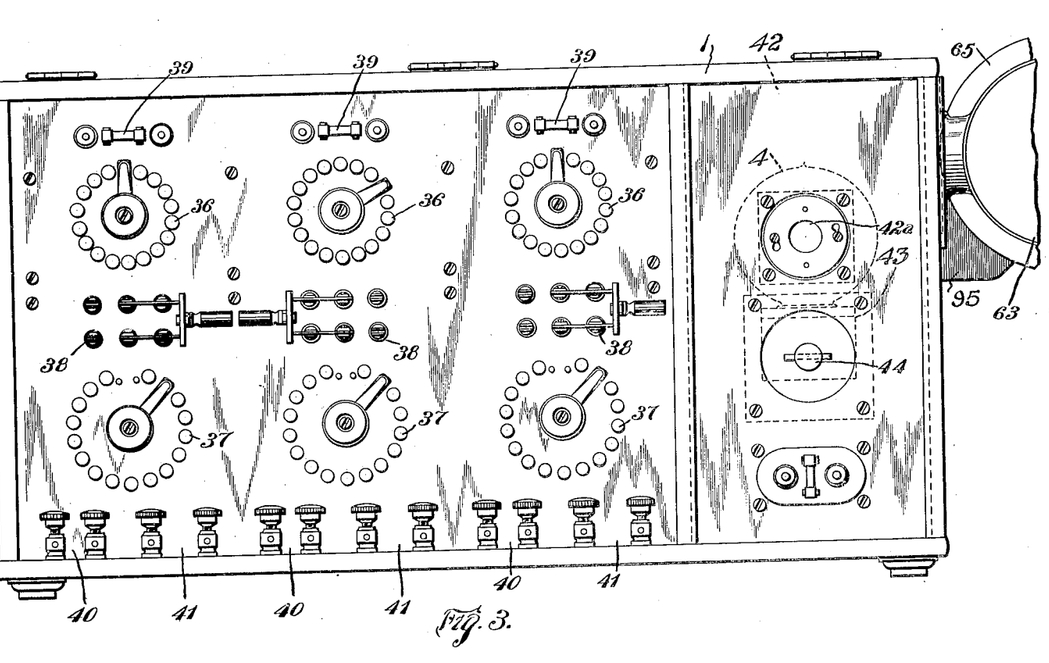
Fig. 3 is an elevational view of the resistor side of the oscillograph.

The resistors 3 are disposed between a wall 33 and a wall 34 in a resistance compartment 35 and beneath the galvanometer compartment 32. These resistors are wound on micarta cards 33a that are supported by suitable frames 34a. They are so connected to dial switches 36 and 37 and knife-blade switches 38 that the vibrating elements may be used on relatively wide ranges of voltage. Fuses 39 are provided to protect the vibrating elements, and binding posts 40 and 41 are provided for connecting the various resistors in circuit with the vibrating elements. It will be noted that the binding posts 40, are relatively closer to each other than are the binding posts 41, which indicates that the one set is for low voltage and the other set is for high voltage. The switches are double-pole double-throw and are adapted to connect either the resistors of the dial plates 36 or the resistors of the dial plates 37 in circuit with the various galvanometer elements. It will be understood that the resistors of the dial plates 36 are of relatively low resistance while the resistors of the dial plates 37 are of relatively high resistance.

The lamp 4 is an ordinary high efficiency low-voltage incandescent lamp or a specially designed lamp and it is disposed in a compartment 42 adjacent the compartment 35 and the compartment 7. The lamp 4 is mounted in a receptacle 43 that may be adjusted by a screw 44 to cause the filament thereof to be placed in alinement with a lens 45 in the optical box 7. An ammeter 46, for indicating the galvanometer field supply and battery-charging currents, is disposed outside the compartment 42 as is a push-button switch 47 for controlling the circuit of the galvanometer field winding 13. A window 42a is provided for the compartment 42.

Figure 1:
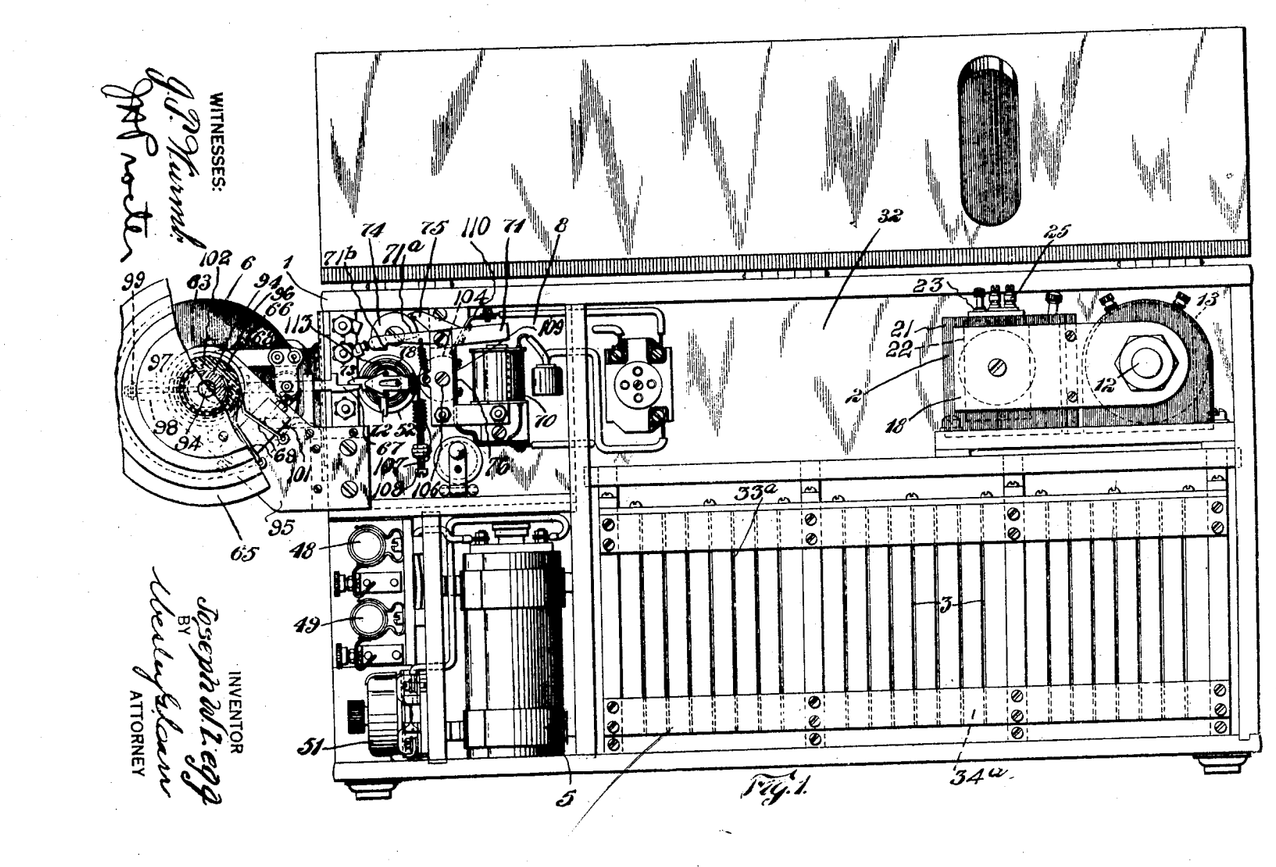
Figure 1 of the accompanying drawings is a side view of an oscillograph embodying my invention.
Figures 2, 16:
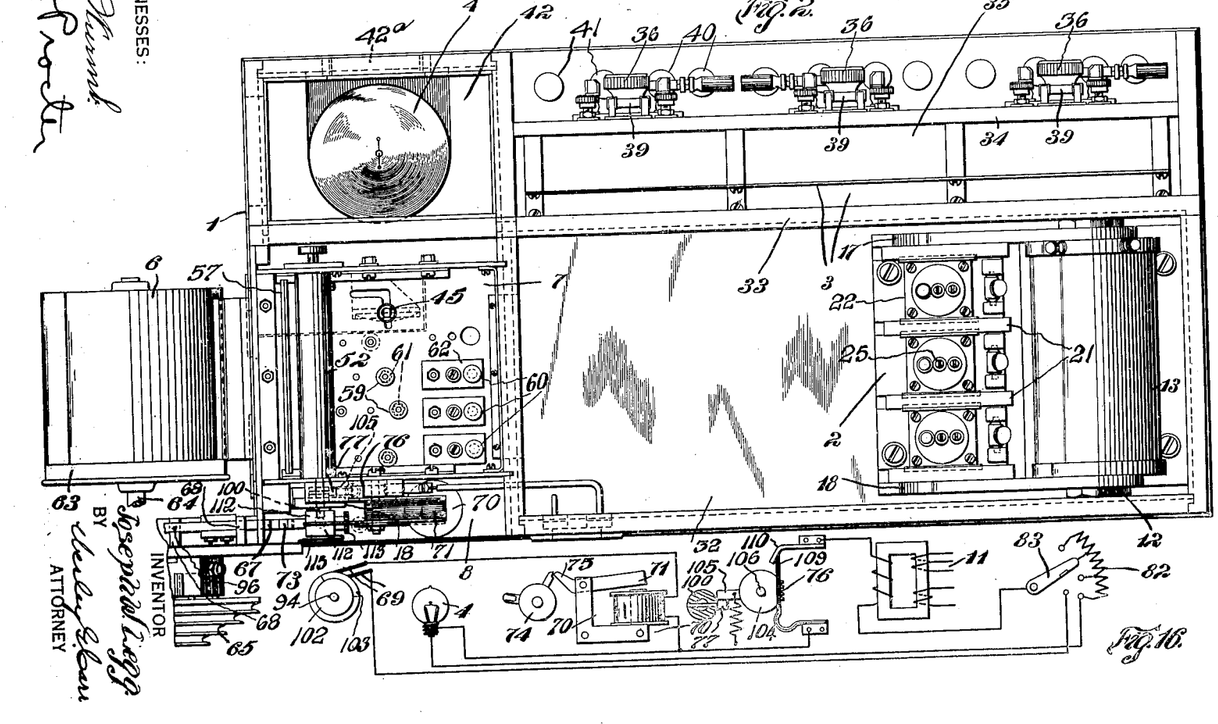
Fig. 2 is a top plan view of the oscillograph shown in Fig. 1.
Fig. 16 is a diagrammatic view of the control circuits for the lamp.
Figure 4:
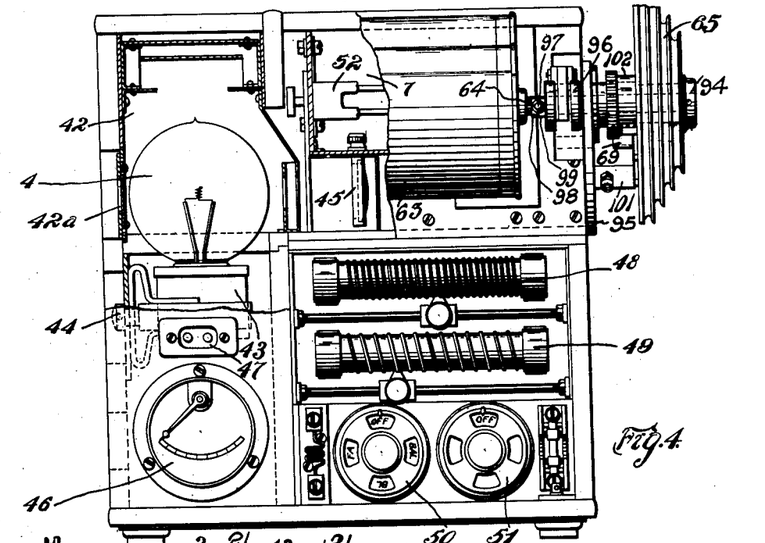
Fig. 4 is a front view, with parts broken away, of the oscillograph shown in Fig. 1.
Figure 5:
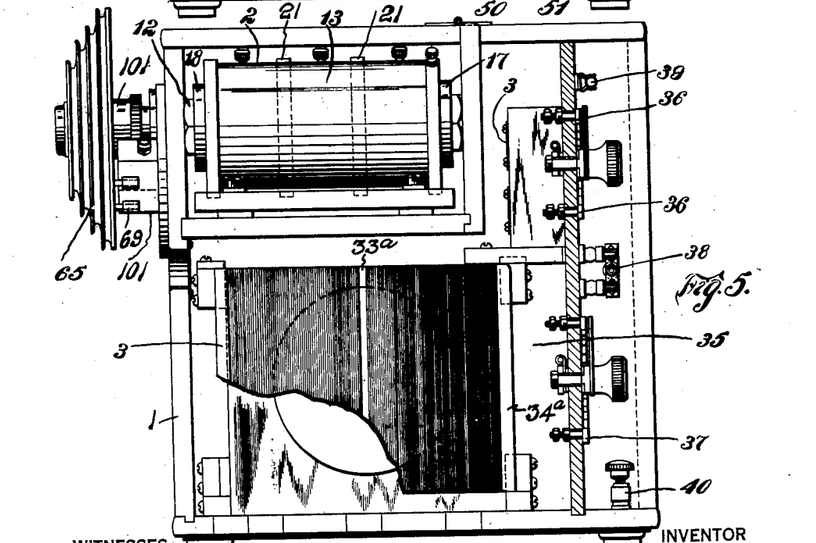
Fig. 5 is a rear view, with parts broken away, of the oscillograph shown in Fig. 1.

Referring to Figs. 1, 2 and 4, adjustable resistors 48 and 49, in the galvanometer field circuit for adjusting the same, are mounted on the front of the casing 1 as are also two snap switches 50 and 51. The switch 50 is adapted to connect the ammeter to indicate either the current in the winding 13 or the charging current of the battery 5. The switch 51 connects the resistors 48 and 49 to the galvanometer field circuit.

Figure 6:
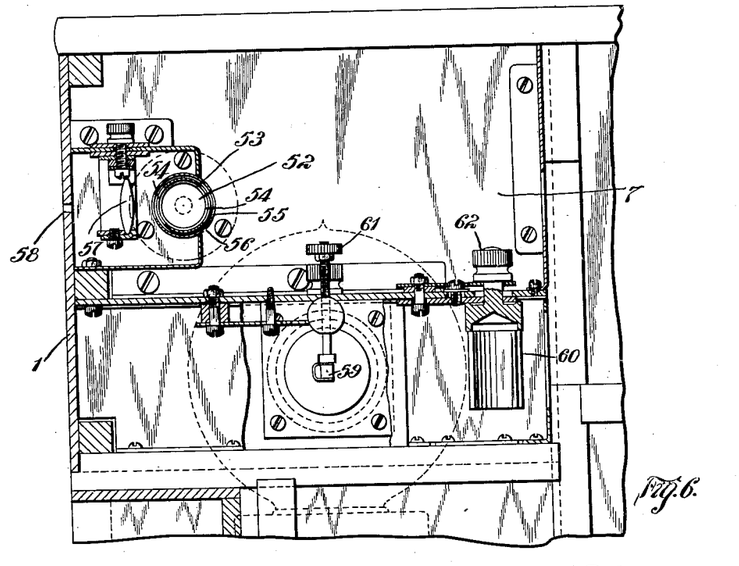
Fig. 6 is a view, partially in elevation and partially in section, of the optical box of the oscillograph.
Figure 7:
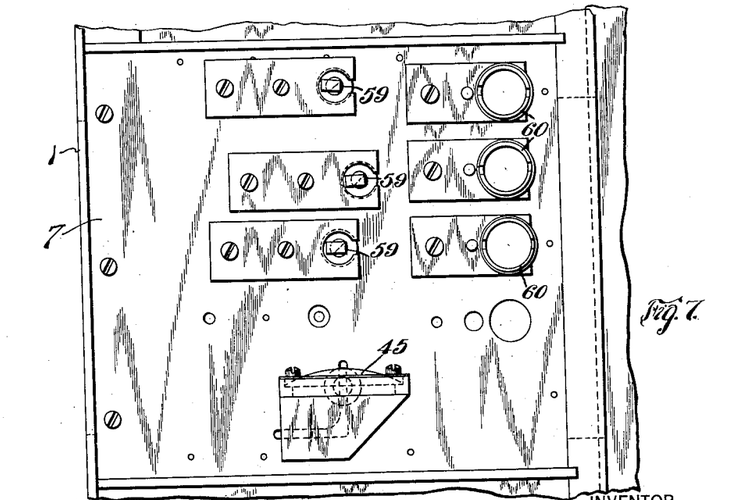
Fig. 7 is a bottom plan view of the optical box shown in Fig. 6.

The optical box 7 comprises a shutter 52 that consists of a cylinder 53 having two diametral slots 54 therein which, when in horizontal position, are in alinement with two slots 55 in a stationary cylindrical member 56. An adjustable lens 57 is disposed in alinement with the slots 54 and 55 and also in alinement with an opening 58 in the housing 1 adjacent the film reel 6. The adjustable lens 45 is adapted to direct the rays of the lamp 4 to prisms 59 which are disposed in alinement with cylinders 60 and which, in turn, are in alinement with the mirrors 29 on the vibrating elements 22 of the galvanometer.

Adjustable means 61 are provided for the prisms 59 and adjusting means 62 are also provided for the cylinders 60. With this arrangement, the beam of light extends from the lamp 4 through the lens 45 to the prisms 59 where it is deflected as a beam through the alined openings in the cylinder 60 to the mirrors 29. From the mirrors, the beam is deflected through the openings 54 and 55 in the shutter 52 and through the lens 57 to the sensitized film of the film reel 6.

Referring to Figs. 1, 2, 17 and 18, film reel device 6 comprises an enclosing housing 63, supported on the housing 1, that supports a reel or drum shaft 64. The latter is disposed in relatively close end-to-end relation to a shaft 94, that is supported by a bracket 95 on the casing 1, upon which a pulley wheel 65 is mounted.

An eccentric or crank device 96 is connected to the inner end of the shaft 94. As shown in Figs. 1, 4, 17 and 18, connection between the adjacent ends of the shafts 64 and 94 is effected by means of two radial arms 97 and 98 disposed on the shafts 64 and on the crank device 96, respectively. The arm 98 is provided, at its outer end, with a radially apertured laterally bent portion 99 through which the outer end of the arm or dog 97 extends. This construction provides a direct-driving connection between the shafts 64 and 94, irrespective of whether these shafts are in exact alinement, by permitting a radial lost motion between the arm 98 and the dog 97.

The crank device 96 is connected to an arm 67 to oscillate the latter with each rotation of the drum shaft 64. The arm 67 is mounted in supports 68 that are secured to the housing 1 and it is adapted to control the operation of the shutter 52. As shown in Figs. 1, 2, 4, 17 and 18, an insulating member 101 secured to the bracket 95, supports contact members 69 which engage an insulating disk or drum 102 (see also, Fig. 16) that is mounted on the shaft 94 and is provided with a perimetral conducting segment 103. This construction is provided for closing a circuit at the end of each rotation of the drum shaft 64 for the purpose of controlling the mechanism 8.

The control mechanism 8 comprises, in general, a trip magnet 70 embodying an armature 71 having an arm 71$^a$ and a shoulder 71$^b$ thereon which engages pins or arms 72 and 73 carried by an end trunnion or shaft 100 of the shutter 52. The arm 73 has a shoulder 73$a$ thereon, for engagement with the outer end of the arm 67, and a shoulder 73$b$, for engagement with a pin 116, for purposes to be hereinafter explained. The pin 72 is of fixed position and length, relative to the shaft 100. As shown more clearly in Fig. 17, a sleeve or member 111, secured to the outer end of the shaft 100 by the pin 77, is provided with an enlarged outer end portion 112 having a transverse opening for the reception of the pin 73. A hollow nut or adjusting member 113 is disposed in the portion 112, in alinement with the pin 73, and contains a spring 114 for biasing the pin 73 outwardly. A leaf-spring member 115 is secured to the outer end face of the portion 112 and supports the pin 116 that projects inwardly therefrom through a slot 117, in the portion 112, to engage the shoulder 73$b$ on the pin 73 to hold the latter in its inner position.

A snap switch 74 is also controlled by an arm 75 of the armature 71 and the trip magnet 70. As shown in Figs. 1, 16, 17 and 18, a switch 76 is disposed between the trip magnet 70 and the optical box 7 and is actuated by a headed pin 77 carried by the shaft 100 of the shutter 52. The switch 76 comprises an insulating disk 104 that is provided with a radial arm 105 for engagement with the pin 77 and a pivot pin or shaft 106, supported on the frame of the electromagnet 70. A spring 107 that extends between the arm 105 and an adjustable screw 108, biases the disk 104 in counter-clockwise direction to engage a contact member 109 thereon with a stationary contact member 110 thereof. A spiral spring 78 that is fixed relative to the casing 1, at its outer end, and attached to the shaft 100, at its inner end, is provided for operating the shutter 52, as hereinafter more fully set forth.

The motor 9 is provided with a step pulley wheel 79 which, when the same is pushed toward the motor, engages the motor shaft through a clutch and is driven directly. When this pulley wheel is pulled outwardly, it is driven through a back gearing 80 and a pinion 81 at substantially $\frac{1}{16}$ of the motor speed. The four steps for a belt (not shown) are so arranged that the center distances are the same for the four belt positions. If the frequency of the induction motor supply does not vary, the film speed remains the same for any position within a fraction of one percent. This is an advantage since no time wave is needed on any film, after the film speed has once been determined for that particular belt and gear position. Also, with this arrangement, the number of cycles on a film may be varied from about 2 to 240.

Figure 14:
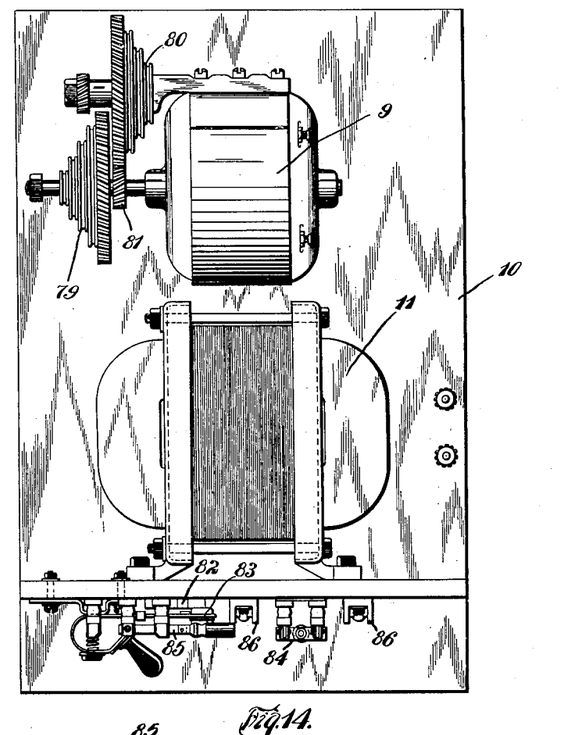
Fig. 14 is a top plan view of the motor and transformer board used in connection with the oscillograph.
Figure 15:
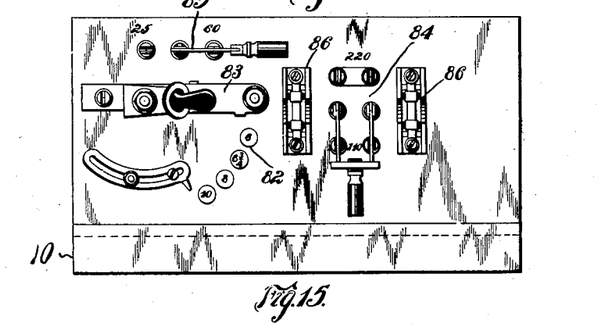
Fig. 15 is a front elevational view of the board shown in Fig. 14.
Figure 17:
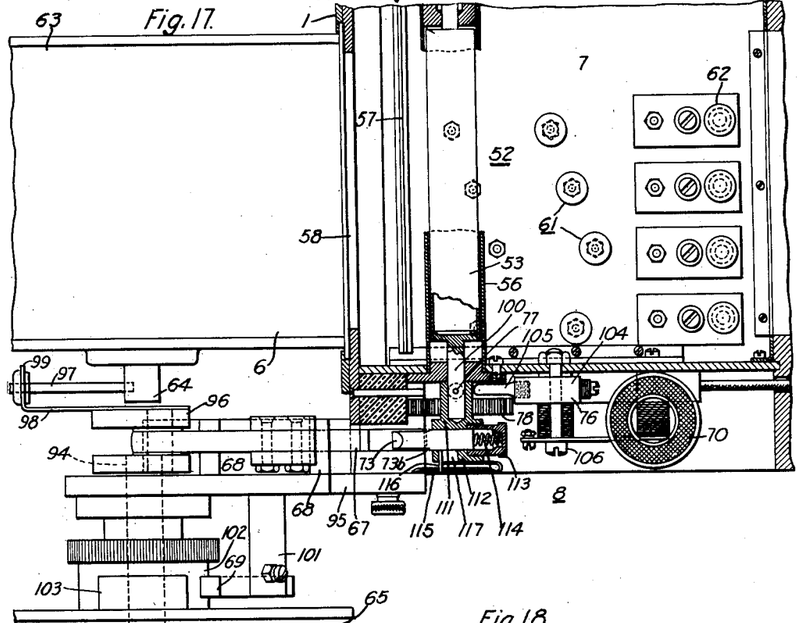
Fig. 17 is an enlarged detail plan view, partially in elevation and partially in section, of the device as shown in the left-hand middle portion of Fig. 2.
Figure 18:
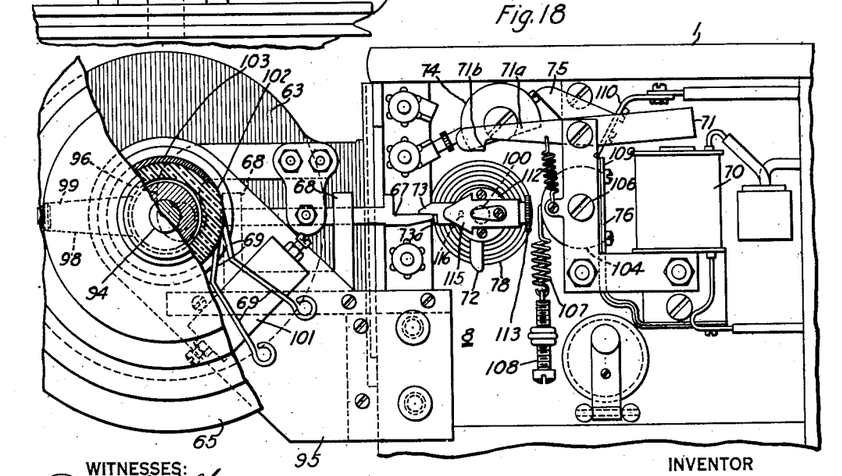
Fig. 18 is a side elevational view of the device shown in Fig. 17 and at the left-hand middle portion of Fig. 1.

The transformer 11 is provided for supplying the voltage to the lamp 4 and is provided with a variable resistor 82 which is connected in circuit with the lamp 4 in such manner that, when the handle or actuating arm 83 (Figs. 14, 15 and 16) thereof is moved to a position at which such voltage is applied to the lamp as to give its maximum intensity of light within safe limits, a circuit is completed through the winding of the trip coil 70 and the contact members 69 on the film drum 6. Thus, as soon as the film drum reaches a definite point in its travel, the winding of the trip magnet 70 is energized and the armature releases the pin 73 which is the longer of the two pins, and permits the pin 72 to move into engagement with the arm 67 by reason of the operation of the spring 78. Since the arm 67 is reciprocated by the drum 6, when the drum is in such position that the film is in the correct position, the arm 67 is moved inwardly sufficiently to release the pin 72 which, through the spring 78 permits the shutter 52 to turn and the slots 54 and 55 to be alined and thus exposes the film on the film drum 6.

When the shutter is open, the long pin 73 is in engagement with the arm 67 and, as the same returns, it so forces the pin 73 inwardly that it is just the same length as the pin 72. The pin or arm 73 is retained in this position by the spring 115 until reset. Thus, when the arm 67 again reaches its inward position, the finger 73 will drop to permit the spring 78 to close the shutter. It will be understood that this permits the shutter 52 to remain open for a single rotation of the film drum.

The instant the trip magnet 70 is energized, it releases the remote control switch 74 which may be adapted to control the apparatus, a test of which is to be taken. The contact members 69 of the film shaft may be set to trip the magnet at any interval of time ahead of the exposure equal to the time lag of the remote controlled apparatus being tested.

The pin 77 of the shutter shaft strikes an arm on the switch 76 to extinguish the lamp 4 as soon as the shutter is closed. This prevents the lamp from being burned out because of prolonged excess voltage and also precludes the lighting of the lamp until the spring 78 of the shutter has been wound, as the switch 76 may not be closed until the spring 78 is wound.

The double-pole double-throw switch 84 is provided on the board 10 for changing the transformer 11 for operation on 110 or 220 volts, and a switch 85 is provided for causing the motor 9 to operate on 25 or 60 cycles. Fuses 86 are provided for protection of the apparatus.

Figure 8:
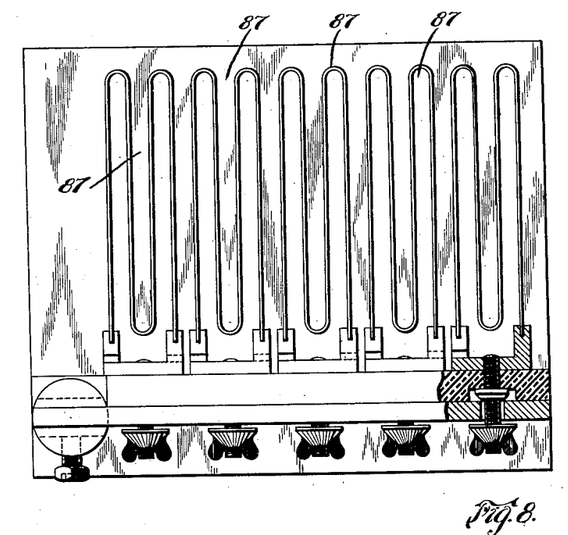
Fig. 8 is a top view, partially in section and partially in plan, of a current shunt that may be used in connection with the oscillograph.
Figure 9:
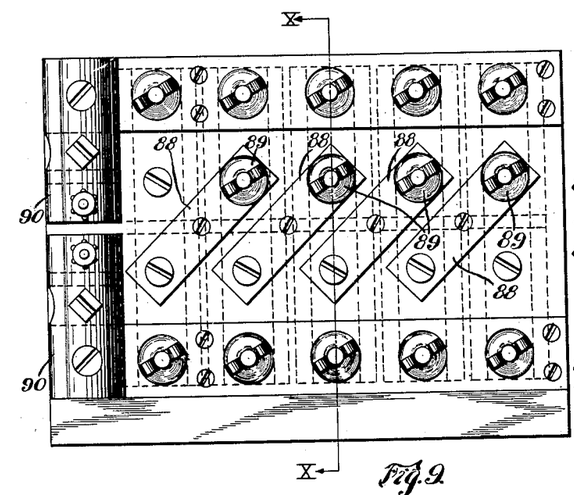
Fig. 9 is a front elevational view of the shunt shown in Fig. 8.
Figure 10:
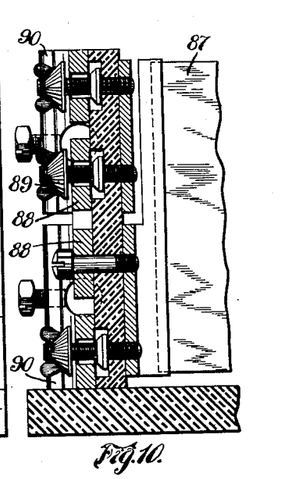
Fig. 10 is a view, taken along the line X—X of Fig. 9.

In Figs. 8, 9 and 10, I have illustrated a shunt which is adapted for use with my oscillograph. It comprises five strips 87 of manganin or other similar material and means for connecting the strips either in series or in parallel. The strips are arranged non-inductively with respect to each other and are provided with a number of connecting strips 88 which are adapted to be secured in position by thumb nuts 89 for the purpose of connecting the strips in series. Terminals 90 are provided to facilitate connecting the shunt in series with the line. This shunt has been found to give exceedingly good results and it may be used for very wide ranges of current tests.

In operation, the longitudinally movable pin 73 is initially turned, by hand, in the clockwise direction until it is latched, in a vertical position, by the shoulder 71b on the arm 71a of the armature 71. In this position, the fixed or shorter arm 72 is disposed just above the outer end of the arm 67, but not in engagement therewith, and the shutter 52 is in closed position. The snap switch 74 is also manually set, against the tension of its spring, and held in set position by the arm 75 of the armature 71.

Before manually operating the switch arm 83, the switch 85 is closed to operate the motor 9. Movement is transmitted from the motor 9 through the pulleys 79 or 80 and through a belt (not shown) to the pulley 65, which causes the film reel 6 to rotate. When the switch arm 83 is thereafter moved downwardly, as viewed in Figs. 15 and 16, it initially energizes the lamp 4, at a low-voltage value, and gradually increases this value until, at its final position, the lamp is illuminated at a much higher intrinsic brilliancy than it is normally adapted to endure. At the instant that the latter voltage is imposed on the lamp, the circuit of the trip magnet 70 is closed to trip the snap switch 74 which operates the device of which an oscillogram is being taken. If the device being tested is a circuit interrupter having operating magnets etc., there is naturally an infinitesimal time lag between the time of the closing of the switch 74 and the time of the actual resultant operation of the device under test. Therefore, the switch 74 is adjusted to operate by a length of time, ahead of the device under test, that is equivalent to any such time lag or to the sum of any number of such time lags. This is to ensure that the moving film will be initially moved into the range of reflected light from the galvanometer 2 only at the instant from which a record is desired.

Simultaneously with the tripping of the switch 74, the arm 73 is released by the armature 71, and moves a slight distance, in the counter-clockwise direction until the fixed arm 72 engages the outer end of the arm 67 which, by reason of its relation to the contact segment 103 on the drum 102, will be in proper position, at the outer end of its stroke, to so receive the arm 72.

At the end of the time interval for which the switch 74 was set, the arm 67 releases the arm 72 to turn the shutter 52 one quarter of a revolution to, thereby, open the latter and to expose the film. The quarter revolution is completed by the engagement of the longer arm 73 with the arm 67 while the latter is in its outermost position.

During the time interval which is required for the film to pass the open shutter 52, the arm 67 moves outwardly against the shoulder 73ª on the arm 73 to move the latter inwardly against the action of the spring 114 until the arm 73 is latched in its inner or shorter position by the spring 115 and the pin 116. Thus shortened, the pin 73 will be released to permit another quarter revolution of the shutter 52, to close the latter, when the arm 67 again moves outwardly. The film-exposure time interval ends when the arm 73 is thus released.

When the arm 73 is so released, the pin 77 engages the arm 105 to open the switch 76 to, thus, extinguish the lamp 4, and the operation is complete. All of the above described operations occur within such a short time interval as to require the lamp 4 to be illuminated at its highest voltage value for an infinitesimal fraction of a second, so that, while the lamp would ordinarily burn out in a relatively short continuous time interval, if operated at such voltage, it is available for many operations of the oscillograph.

My invention is not limited to the specific details illustrated as it may be variously modified without departing from the spirit and scope of the invention, as set forth in the appended claims.

I claim as my invention:

1. In an oscillograph, the combination with a rapidly movable galvanometer element and a sensitized recording element of an incandescent lamp for cooperating with the galvanometer and effective to record the deflection of the galvanometer on the recording element, a shutter for controlling the exposure of said element, and means for effecting the operation of said shutter and the opening and the closing of the circuit of said lamp in predetermined order.

2. In an oscillograph, the combination with a rapidly movable galvanometer element, and a sensitized recording element of an incandescent lamp for cooperating with the galvanometer and effective to record the deflection of the galvanometer on the recording element, and cooperating means for automatically controlling the circuit of the incandescent lamp and the exposure of said recording element.

3. In an oscillograph, the combination with a high period galvanometer element, a shutter and a rapidly movable sensitized member, of an incandescent lamp effective to record the deflection of the galvanometer element on the sensitized member, means for energizing the source of illumination, for automatically actuating the shutter to expose the sensitized member with reflected image from the galvanometer and for de-energizing the source of illumination after the shutter is closed.

4. An oscillograph, comprising a high-period galvanometer element, a shutter, a rapidly movable sensitized member, an incandescent lamp effective to record the deflection of the galvanometer on the sensitized member and means for closing the circuit of the lamp, and for automatically actuating the shutter and opening the circuit of the lamp immediately after the shutter has been actuated.

5. An oscillograph comprising a shutter, a lamp and means for successively opening the shutter to obtain an oscillographic record when a predetermined voltage is applied to the lamp, closing the shutter and extinguishing the lamp immediately after the record is obtained.

6. An oscillograph comprising a shutter, a lamp and a trip coil for opening the shutter to obtain an oscillographic record when a predetermined voltage is applied to the lamp and for closing the shutter and extinguishing the lamp after the record is obtained.

7. In an oscillograph, the combination with an incandescent lamp adapted to be subjected to a variable voltage, a shutter and a photographic drum, of means for automatically controlling the lamp, shutter and drum to limit the period during which the lamp is subjected to maximum voltage and to expose the drum during said time.

8. In an oscillograph, the combination with a lamp, a shutter and a photographic drum, of a trip magnet for releasing the shutter, means actuated by the drum for controlling the shutter, and means actuated by the drum for controlling the trip magnet.

9. In an oscillograph, the combination with a lamp, a shutter and a photographic drum, of a trip magnet for releasing the shutter, means actuated by the drum for controlling the shutter, means actuated by the drum for controlling the trip magnet, and means actuated by the shutter for extinguishing the lamp.

10. In an oscillograph, the combination with a lamp, a shutter and a photographic drum, of a trip magnet, a remotely-controlled switch controlled by the trip magnet, a spring for actuating the shutter, means whereby the trip magnet holds the shutter in predetermined positions, means actuated by the drum for controlling the operation of the shutter holding means, a switch for the lamp, and means on the shutter for controlling the lamp switch.

11. In an oscillograph, the combination with a shutter and a remotely-controlled switch, of a trip magnet for the switch, and means whereby the trip magnet is operated a sufficient time before the shutter is operated to equal the time lag of the remotely-controlled apparatus to be tested.

12. In an oscillograph, the combination with a high-speed movable element and a movable sensitized recording element, of an incandescent lamp effective to record movement of the high-speed element on the recording element and means operable upon the effective illumination of said lamp to momentarily expose said recording element and to thereupon de-energize the circuit of said lamp.

13. In an oscillograph, the combination with a high-speed movable element and a high-speed movable sensitized recording element, of an incandescent lamp and means for increasing momentarily only the normal illuminating effect thereof to effect a record of movement of the high-speed element on the recording element.

14. In an oscillograph, the combination with a high-speed movable element and a movable sensitized recording element, of an incandescent lamp and means for momentarily increasing the voltage impressed on the lamp to a value above the normal operating voltage value thereof.

15. The combination with an incandescent lamp, of means for impressing a voltage thereon above the normal operating voltage value of the lamp and for automatically reducing said increased voltage at the end of a predetermined time interval.

16. In an oscillograph, the combination with a lamp, a recording element, a shutter and means for applying a variable voltage to said lamp, of means operable upon the application of predetermined voltage to said lamp to open said shutter to expose said recording element for a predetermined period.

17. In an oscillograph, the combination with a lamp, a recording element, a shutter and means for applying a variable voltage to said lamp, of means operable upon the application of predetermined voltage to said lamp to open said shutter to expose said recording element and to close said shutter after a predetermined period.

18. In an oscillograph, the combination with a sensitized recording element, a galvanometer element rapidly movable relative thereto, an incandescent lamp adapted to be subjected to an excessive voltage to effect a record of the movement of the galvanometer element on the sensitized recording element and means for automatically limiting the time during which the lamp is subjected to excessive voltage.

19. In a portable high-period oscillograph, the combination with an incandescent lamp, a galvanometer, a movable sensitized record chart, a shutter and means for directing light beams from the lamp to the galvanometer and from the galvanometer to the record chart when the shutter is open, of means for automatically opening the shutter and moving the record chart and for closing the shutter and extinguishing the lamp.

20. A portable self-contained high-period oscillograph unit comprising a casing defining a chamber having an opening in the wall thereof, a galvanometer element in the casing for transmitting light through said opening, a movable light-receiving element disposed exteriorly of said casing, a source of light for the galvanometer element disposed in the casing, and a shutter for said opening actuated in response to movement of said light-receiving element.

21. An oscillograph comprising a casing including a portion defining a chamber having an opening in a wall thereof, a movable light-receiving element at one side of said opening, a galvanometer element at the opposite side of said opening for transmitting light to said light-receiving element through said opening, a source of light for said galvanometer element, and a shutter for said opening disposed between the galvanometer and light-receiving elements and actuated in response to movement of said last-named element.

In testimony whereof, I have hereunto subscribed my name this first day of September, 1920.

JOSEPH W. LEGG.